United States Patent Office 3,081,151
Patented Mar. 12, 1963

3,081,151
MANUFACTURE OF ALKALI ORTHOPHOSPHATES
Jean Marty, Grand Quevilly, France, assignor to
Compagnie de Saint-Gobain, Paris, France
No Drawing. Filed July 29, 1959, Ser. No. 830,204
Claims priority, application France Sept. 23, 1958
9 Claims. (Cl. 23—107)

This invention relates to the making of alkali orthophosphate liquors, which are used extensively in the preparation of polyphosphates by the calcination of orthophosphate mixtures.

If good polyphosphates are to be prepared with a high conversion ratio of the $P_2O_5$ the orthophosphates must be of high purity. Such purity is easily obtained when using dry process $H_3PO_4$, but very difficult to obtain from wet process $H_3PO_4$, involving a complex and difficult purification. Heretofore the purification included the addition to the wet process $H_3PO_4$ of various precipitants and purifiers, including ferrous sulfate, active carbon, barium or calcium carbonate to precipitate sulfate ions, and sodium sulfide. Some of these reactants were used in direct treatment of the acid, before neutralization but most of them were employed in the transformation of the $H_3PO_4$ to orthophosphates. The steps are extensive, the investment is burdensome, and the losses of $P_2O_5$ substantial, all being reflected in the price of the product.

It is an object of the invention to improve the process of making orthophosphates using wet process $H_3PO_4$.

The transformation, called neutralization in the trade, was accomplished by adding a basic substance to the acid, for instance alkali carbonate, in a proportion sufficient to produce an orthophosphate liquor. When sodium tripolyphosphate liquor was prepared the end point was reached when the ratio of $Na_2O$ to $P_2O_5$ in the liquor attained about 1.67. This was an essential step in the purification process. When disodium orthophosphate was to be prepared that ratio was brought to about 2.

There was thus prepared a sludge formed by the solution of orthophosphates desired, holding in suspension a precipitate that was removed by filtration. The filtration was slow and became slower as the cake built up.

It is another object to improve the speed of filtration of orthophosphate sludges.

Various modified processes have been tried. It is possible to compare them by the following standards, which are equally applicable to the present invention:

The degree of purification of the orthophosphates liquor is rapidly determinable by concentrating the clear filtrate and determine whether a new precipitate forms; there should be none or very little;

The speed of filtration. Comparison is readily made by filtering different sludges under identical conditions of temperature, dilution, filter material, and vacuum. It is expressed in liters of clear liquor passed by the filter per hour per square meter of filter surface;

The $P_2O_5$ retained in the filter cake, which occurs in two forms, a part insoluble in water usually being metallic phosphates which are the richer in $P_2O_5$ as they are less saturated, and a water soluble pate formed of alkali phosphates retained in the insoluble part. The latter can be washed out with water. The $P_2O_5$ retained in the cake is expressed in percent of the total $P_2O_5$ put into the process as $H_3PO_4$. The efficiency of washing is expressed as the percent $P_2O_5$ contained in the filtrate compared with the $P_2O_5$ in the sludge before filtration.

These three essential considerations determine the efficiency of a process. The purity of the filtrate is of highest importance, as a pure filtrate eliminates after treatments. The speed of filtration controls the duration of filtration, the size and number of filtering apparatus, and the investment.

The nature of the filter cake affects the success of the process by its size, which should be the smallest possible, and by its content of $P_2O_5$, which is in the cake in a commercially inferior form and may even be worthless.

No matter what process is used there are a number of variables that must be taken into consideration and compensated for, but these are customarily done in the ordinary course by the plant engineer and need no discussion here: the source of the phosphates used in making $H_3PO_4$, the preliminary treatment of the $H_3PO_4$, the nature of the adjuvants, their time of introduction, the temperature of the reaction masses, dilution and agitation. To the extent that they are noteworthy in this new process they are noted in the description that follows.

A major object of the present invention is to improve an existing method of preparing orthophosphates liquors, the general nature of which has been described hereinabove.

The objects of the invention are accomplished generally speaking by a continuous process of making alkali orthophosphate liquors in which the neutralization of the phosphoric acid is carried out in the presence of the several reactants and purifiers which were employed in the prior art processes but in which the neutralization is carried out in two stages, in the first of which the molecular proportion $Na_2O$ (or its equivalent) to $P_2O_5$ is maintained between 1 and 1.2, and preferably between 1.05 and 1.10 and in a second stage the final proportion between $Na_2O$ and $P_2O_5$ is attained. In the second stage when one is preparing an orthophosphate liquor containing largely trisodium orthophosphate the second stage of neutralization brings the ratio $Na_2O$ to $P_2O_5$ to about 1.67. When disodium orthophosphate is largely being prepared the second stage of the process brings the ratio $Na_2O$ to $P_2O_5$ to about 2.00.

In practice the process of the invention includes the introduction to a reaction vessel of phosphoric acid, the purifying reactants and alkali carbonate. There is thus established a reaction mass in which the ratio of neutralization ($Na_2O:P_2O_5$) is between 1 and 1.2. The addition of alkali carbonate and phosphoric acid is made so as to maintain this ratio within the set limits. From this reaction mass a stream flows continuously and without filtration to a second vessel containing a second reaction mass in which the ratio $Na_2O$ to $P_2O_5$ is raised to that which is desired in the final product. This ratio is maintained constant in the reaction mass by adding a supplemental stream of alkali carbonate. A stream is drawn from the second reaction mass to a filter.

In cases where a high degree of desulphatation is desired in the orthophosphate liquor the $SO_4$ ions are preferably precipitated in a preliminary stage by the addition of a reactant such as $BaCO_3$ which is introduced to the phosphoric acid itself before the phosphoric acid is introduced to the first reaction mass of the new process. The phosphoric acid, thus charged with barium sulphate, may be introduced directly and without filtration into the first reaction mass of the new process. It should be stated that $BaCO_3$ may be omitted if a very high degree of desulphatation is not deemed necessary.

The following examples compare the preparation of sodium orthophosphates liquor which is destined for use in the manufacture of tribasic sodium polyphosphate, as it is prepared by the process of the prior art, as outlined hereinabove, and as it is prepared by the present invention. This enables one to see immediately the material advantages of the present invention. The three bases of comparison above enumerated are employed and it will be observed that in every instance a marked improvement in at least one of these categories is obtained. In all the examples the weight of the filter cake obtained is indicated by 630 grams of $P_2O_5$ introduced into the process. In the examples paragraphs "A" describe the known process and paragraphs "B" describe this invention.

*Example 1*

A. Into a reaction vessel stirred by a helico-agitator, aqueous phosphoric acid containing 25 percent $P_2O_5$ was introduced at 30° C. Active carbon was added with $FeSO_4$ and $BaCO_3$. After ten minutes of agitation sodium carbonate was added until the ratio of $Na_2O$ to $P_2O_5$ of 1.67 was attained. In the meantime the temperature was raised progressively from 30° C. to 70° C. The total duration of these operations was 1 hour 50 minutes. This produced a sludge that was diluted with water to a density of 1.296. The diluted sludge was agitated for 30 minutes at 70° C. The sludge was thereafter filtered under moderate vacuum. When submitted to test the product yielded the following results: The filtered liquor was clear and when concentrated showed only a faint precipitation. The filtration attained 225 liters per square meter per hour. The weight of the filtered cake after washing with water was 500 grams. The yield was 94.5 percent. The $P_2O_5$ in the filter cake computed as a percentage of the total admitted was 11 percent.

B. Utilizing the present invention the following process was carried out.

A first reaction vessel maintained at 35° C. received a stream of phosphoric acid, a stream of carbon, a stream of ferrous sulphate ($FeSO_4$), a stream of barium carbonate ($BaCO_3$), and a stream of $Na_2CO_3$, the latter in a proportion calculated with respect to the input of $H_3PO_4$ to maintain in this first reaction mass a ratio of $Na_2O$ to $P_2O_5$ of 1.05. A stream of reaction product equal to the combined input passed by overflow to a second reaction vessel containing a second reaction mass which was maintained at 70° C. and which received continuously a stream of sodium carbonate sufficient to maintain the ratio of $Na_2O$ to $P_2O_5$ at 1.67. The useful volume of the reaction vessels was calculated to obtain residence of the reactant introduced to the first reaction mass of 1 hour 10 minutes and a period of residence in the second reaction mass of 40 minutes, making a total of 1 hour and 50 minutes as in Example 1A.

The second reaction vessel communicated by overflow with a third where the dilution of the reaction mass to water to a density of 1.296 was carried out. The reaction products remained 30 minutes in the third vessel. The reaction product was filtered under conditions identical with those in Example 1A and identical tests were carried out yielding the following results: The filtrate was clear and produced only a faint precipitate on concentration. The speed of filtration was 1,090 liters per square meter per hour. The weight of the filter cake after washing with water was 360 grams. The yield was 99.4 percent. The $P_2O_5$ retained in the filter cake was 7.3 percent of the total $P_2O_5$.

The advantages of the new process are substantial and obvious. However, one might think that the improvement arises by changing the process from a batch process to a continuous process. This, however, is not the fact as indicated in Example 2 wherein it is shown that the main operative agent in the new process is the two-stage neutralization.

*Example 2*

A. Into a reaction vessel furnished with an agitator and an overflow, phosphoric acid containing 25 percent $P_2O_5$ was flowed together with enough $BaCO_3$ to precipitate $SO_4$ ions. The reaction mass was maintained at 35° C. and flowed in a stream to a second vessel containing a reaction mass into which sodium carbonate flowed at a rate establishing a ratio of $Na_2O$ to $P_2O_5$ of 1.67. The second reaction vessel was at a temperature of 70° C. and its useful volume was such that at the time of discharge the average dwell of the materials in the reaction mass was about 2 hours. The sludge issuing from the second vessel in a stream passed to a third vessel where it was diluted with water to a density of 1.296. It was agitated in the third vessel for 30 minutes. Finally the sludge was filtered under conditions identical with those of Example 1. The results were as follows: The filtrate was clear and precipitated slightly upon concentration. The rate of filtration was 225 liters per square meter per hour. The weight of the washed filter cake was 410 grams. The yield of washing was 98.7. The $P_2O_5$ retained in the cake was 9 percent of the $P_2O_5$ total.

B. Operating as above by adding phosphoric acid containing 25 percent $P_2O_5$ to a first reaction vessel with sufficient $BaCO_3$ to precipitate $SO_4$ ions the liquor flowed to a second vessel in which sodium carbonate was continuously introduced, the ratio $Na_2O$ to $P_2O_5$ being maintained at 1.08 and the temperature at 70° C. The useful volume of this second vessel was calculated to retain the inflowing materials for about an hour. From the second vessel the sludge passed to a third which was maintained at a ratio of $Na_2O$ to $P_2O_5$ of 1.67 by the continuous introduction of a stream of $Na_2CO_3$. The dwell of the materials in this second vessel was about 1 hour. The sludge thus obtained was diluted to 1.296 and filtered under the same conditions recited in Example 2A. The results were as follows: The filtrate was clear and remained so after concentration. The speed of filtration was 1.980 liters per square meter per hour. The weight of the cake after washing was 155 grams. The yield of washing was 99.6 percent. The $P_2O_5$ retained in the filter cake was 4.15 percent of the $P_2O_5$ total.

In order to show the preponderant influence of the proportion of $Na_2O$ to $P_2O_5$ used in the initial stage of the new process the following test was carried out:

C. Operating exactly as in "B" of this example but keeping the ratio of neutralization in the second vessel, that is to say in the first stage of neutralization, at .95 instead of 1.08 the results were as follows: The filtrate was clear and precipitated slightly upon concentration. The speed of the filtration was 310 liters per square meter per hour. The weight of the filter cake was 250 grams. The yield of the washing was 98.9 percent. The $P_2O_5$ in the filter cake was 5.75 percent of the total $P_2O_5$. It will be observed that the results of test 2C are better than those of Examples 1A and 2A but are inferior to those obtained in Examples 1B and 2B where the ratio was maintained at 1.05 and 1.08 respectively.

Finally it has been established that the improvement due to the process is invariably found even when the other operative conditions such as temperature, dilution, and so forth are altered.

*Example 3*

A. Into an agitated reaction vessel maintained at 70° C. phosphoric acid containing 15 percent $P_2O_5$ was introduced with $BaCO_3$, ferrous sulphate, and active carbon. After 10 minutes of agitation, sodium carbonate was admitted until the ratio between $Na_2O$ and $P_2O_5$ was 1.67. The temperature was maintained at 70° C. throughout which was about 2 hours. The sludge thus obtained was 33° Baumé and was filtered under vacuum. The results were as follows: The filtrate was clear and only a slight precipitate formed upon concentration. The speed of filtration was 1,065 liters per square meter per hour. The weight of the filter cake was 540 grams. The $P_2O_5$ retained in the cake was 11 percent of the total $P_2O_5$.

B. Putting the invention into operation with the same ingredients, continuous streams of the ingredients were poured into a reaction vessel of such size that the time in the vessel was about 10 minutes. Phosphoric acid identical with Example 3A, ferrous sulphate, and barium carbonate in quantities identical to 3A and active carbon identical with 3A were there mixed. The temperature was maintained at 70° C. The sludge went by overflow to a second container maintained at 70° C. in which one continuously added quantities of sodium carbonate such that the ratio of neutralization was maintained at 1.08. The dwell in this vessel was 1 hour. From this vessel the liquid passed to a third vessel also maintained at 70° and into which there was introduced continuously an additional quantity of sodium carbonate which raised the ratio of neutralization to 1.67. The reactants remained in the second vessel 1 hour so that the total duration in the two vessels was the same as in Example 3A. The sludge was 33° Baumé and was filtered under conditions identical to those of Example 3A. The results were as follows:

The filtrate was clear and precipitated lightly upon concentration. The speed of filtration was 4,115 liters per square meter per hour. The weight of the cake was 270 grams. The $P_2O_5$ retained in the cake was 6 percent of the total $P_2O_5$.

Comparing the results of trials 3A and 3B we can state that for an equal production of orthophosphates liquor, ultimately for tripolyphosphates, the filter surfaces may be ¼ the size and the drying apparatus for the cakes ½ the size when the invention is put into operation.

For 100 kilograms of $P_2O_5$ introduced the final aanlysis showed these results:

Example 3A

| $P_2O_5$: | Kilograms |
|---|---|
| As tripolyphosphate | 89 |
| As mud | 11 |

Example 3B

| $P_2O_5$: | |
|---|---|
| As tripolyphosphate | 94 |
| As mud | 6 |

The commercial value of the mud is at maximum ⅓ that of the tripolyphosphate.

Example 4

A. Under the same conditions as in Example 1A phosphoric acid containing 25 percent $P_2O_5$, derived from pebble phosphate of 75 percent concentration, and the neutralization, was pursued until the ratio of $Na_2O$ to $P_2O_5$ equalled 2.00, thus producing mainly disodium phosphate. The results were as follows: The liquor filtered clear precipitating lightly upon concentration. The speed of filtration was 90 liters per hour per square meter. The weight of the washed cake was 1,120 grams. The yield of washing was 79 percent. The $P_2O_5$ retained in the cake was 32 percent of the $P_2O_5$ treated.

B. Using the same phosphoric acid as in Example 4A the process of the invention was applied similarly to Example 1B but increasing the neutralization in the second stage until the ratio $Na_2O$ to $P_2O_5$ equalled 2. The results were as follows: The filtrate was clear and did not precipitate on concentration. The speed of filtration was 1,200 liters per meter squared per hour. The weight of the washed cake was 375 grams. The yield of the washing was 98.5 percent and the $P_2O_5$ retained in the filter cake was 12 percent.

Example 5

A. Under the same conditions as in Example 3A, phosphoric acid, derived from 68 percent pebble phosphate, and the acids have been preliminarily diluted to 18 percent $P_2O_5$ by the liquor coming from the washing of previous filter cakes. The results of the filtration were as follows: The filtrate filtered readily and only precipitated slightly upon concentration. The speed of the precipitation was 33 liters per meter squared per hour. The weight of the washed filter cake was 1,185 grams. The yield of washing was 82 percent. $P_2O_5$ retained in the cake was 32.5 percent compared to the total $P_2O_5$.

B. The process of this invention was applied to the same phosphoric acid as above, under conditions analogous to those of Example 3B, the ratio $Na_2O$ to $P_2O_5$ being maintained at 1.08 in the second vat. The results were as follows: The liquor filtered was perfectly clear and did not precipitate on concentration. The speed of filtration was 4,500 liters per meter squared per hour. The weight of the washed cake was 435 grams. The yield of washing was 98%. $P_2O_5$ retained in the cake was 16 percent with respect to the $P_2O_5$ treated.

Example 6

A. As in Example 1A phosphoric acid containing 25 percent $P_2O_5$, which was derived from Senegal, showed the following results: The weight of the filter cake was 1,090 grams. The yield of washing was 85.6 percent. $P_2O_5$ retained in the cake was 22 percent with respect to the total $P_2O_5$ treated. Speed of filtration was 135 liters per meter squared per hour.

B. Apply the process of the invention on the same acid as above under the conditions described in Example 1B. The following results were obtained: The liquor filtered perfectly clear and did not precipitate on concentration. The speed of filtration was 1,800 liters per meter squared per hour. The weight of the washed cake was 290 grams. The yield of washing was 99.5 percent. The $P_2O_5$ contained in the cake was 4.5 percent based on the total $P_2O_5$ treated.

Example 7

A. The example was carried out exactly as in Example 1A except that $K_2CO_3$ replaced $Na_2CO_3$. The results were as follows: The speed of filtration was 860 liters per meter squared per hour. The weight of the filter cake was 550 grams. The yield of washing was 94.5 percent. The $P_2O_5$ retained in the cake was 11.2 percent with respect to the total $P_2O_5$ treated.

B. The same process modified by the new invention was applied to the same acid as described in Example 1B using $K_2CO_3$ to maintain the ratio $Na_2O$ to $P_2O_5$ at 1.08. The results were as follows: The speed of filtration was 1,350 liters per meter squared per hour. The weight of the filter cake was 320 grams. The yield of washing was 99 percent. The $P_2O_5$ retained in the cake was 6.5 percent compared to the total $P_2O_5$ treated.

The advantages of the invention are set forth in detail in the examples. Although the examples have been directed to the use of sodium and potassium salts, it is to be understood that the other alkali metal salts are useful and that in the production of alkali metal orthophosphates from other alkali metals the advantages of the invention are obtained.

As many apparently widely different embodiments of the present invention may be made without departing from the spirit and scope thereof, it is to be understood that the invention is not limited to the specific embodiments.

What is claimed is:

1. A process of producing alkali orthophosphates liquor that comprises mixing a flow of wet process $H_3PO_4$ containing about 25 percent $P_2O_5$, with $BaCO_3$, $FeSO_4$, $Na_2CO_3$, and with active carbon with agitation in a first reaction mass, at rates producing a ratio $Na_2O:P_2O_5$ of about 1.05, at a temperature of about 35° C., for about 1 hour 10 minutes, transferring a stream of the first reaction mass, at a rate equalling the addition of raw materials, to a second reaction mass, and adding thereto a stream of $Na_2CO_3$ sufficient to establish the ratio $Na_2O:P_2O_5$ of about 1.67, a temperature of 70° C. being maintained for about 40 minutes, transferring a stream of the second reaction mass at a rate equalling the inflow of first reaction mass, to a third reaction mass, diluting it with water to a density about 1.296, and maintaining it in the mass for about 30 minutes, at about 70° C., and filtering the third reaction mass under vacuum at a rate equalling the inflow of second reaction mass, thereby separating the alkali orthophosphates liquor from the filtered solids.

2. A method of producing alkali orthophosphates liquor that comprises forming a first reaction mass of $H_3PO_4$ and alkali carbonate containing about 25 percent $P_2O_5$, and $FeSO_4$ and $BaCO_3$ in amount adequate to precipitate the $SO_4$ ions, flowing the liquid to a second reaction mass and introducing thereto $Na_2CO_3$ at a rate which maintains the ratio $Na_2O:P_2O_5$ at about 1.08, maintaining the temperature at about 70° C., after about an hour in the second reaction mass flowing the product to a third mass, maintaining the said ratio at about 1.67 by adding $Na_2CO_3$, after about an hour in the third reaction mass diluting it to a density about 1.296, and filtering it, thereby separating the orthophosphates liquor from the filtered solids.

3. The method of claim 2 in which the ratio in the second reaction mass is kept at .95 instead of 1.08.

4. The method of claim 1 in which the product of the stream from the first reaction mass is mixed in the second reaction mass with enough $Na_2CO_3$ to establish the ratio $Na_2O:P_2O_5$ of about 2 whereby to produce disodium orthophosphate.

5. The method of claim 1 in which the $Na_2CO_3$ is replaced by an equivalent amount of $K_2CO_3$.

6. A continuous flow process of making alkali orthophosphate liquors that comprises flowing streams of wet process phosphoric acid and alkali carbonate into a reaction mass including precipitants and purifiers selected from the group consisting of ferrous sulfate, active carbon, barium carbonate, calcium carbonate, and sodium sulfide, at a rate which maintains in the reaction mass a ratio equivalent to a ratio of $Na_2O$ to $P_2O_5$ between 1.0 and 1.2, flowing a stream of this reaction mass into a second reaction mass with enough additional alkali carbonate to establish a ratio for $Na_2O/P_2O_5$, between a minimum of about 1.67 and a maximum of about 2.0, and isolating the alkali orthophosphate solution by filtration.

7. A continuous flow process of making alkali orthophosphate liquors that comprises flowing streams of wet process phosphoric acid and alkali carbonate into a reaction mass at a rate which maintains in the reaction mass a ratio equivalent to a ratio of $Na_2O$ to $P_2O_5$ between 1.0 and 1.2, flowing a stream of this reaction mass into a second reaction mass with enough additional alkali carbonate to establish a ratio of $Na_2O/P_2O_5$ in a range between about 1.67 and about 2.0, and isolating the alkali orthophosphate solution.

8. A method of producing orthophosphates liquor which comprises mixing $H_3PO_4$ with $BaCO_3$, $FeSO_4$ and active carbon in a first reaction mass and retaining them therein for about 10 minutes at about 70° C., transferring the reaction product to a second reaction mass at about 70° C. and adding $Na_2CO_3$ thereto at rate establishing a ratio of $Na_2O:P_2O_5$ of about 1.08 and retaining the reactants in the mass about an hour, transferring the reaction product from the second mass to a third reaction mass and adding enough $Na_2CO_3$ to bring the said ratio to about 1.67 and retaining the reactants in the mass about an hour, filtering the reaction product under vacuum and thereby separating the alkali orthophosphates liquor from the precipitated solids.

9. The continuous flow method of preparing sodium orthophosphates liquor that comprises mixing a stream of 18 percent $P_2O_5$, with $BaCO_3$, active carbon, and $FeSO_4$ in a first reaction mass in amount precipitating the $SO_4$ ions, at about 70° C., flowing part of the first reaction mass to a second reaction mass at about 70° C., and adding $Na_2CO_3$ in amount sufficient to establish the ratio $Na_2O:P_2O_5$ of about 1, flowing part of the reaction product of the second mass to a third reaction mass, and adding enough $Na_2CO_3$ to establish a ratio $Na_2O:P_2O_5$ of about 1.67 at a temperature of about 70° C., and filtering the product, thereby separating the sodium phosphates liquor from the precipitated solids.

References Cited in the file of this patent
UNITED STATES PATENTS

| | | |
|---|---|---|
| 2,044,940 | Haage et al. | June 23, 1936 |
| 2,390,400 | Taylor | Dec. 4, 1945 |
| 2,747,964 | Bacon et al. | May 29, 1956 |
| 2,898,189 | Rodis et al. | Aug. 4, 1959 |